United States Patent
Hildebrand

(10) Patent No.: US 10,169,784 B1
(45) Date of Patent: Jan. 1, 2019

(54) SYSTEMS AND METHODS FOR LOAN ORIGINATION AND SERVICING BASED ON A RECURRING DEPOSIT OF FUNDS

(75) Inventor: Marc William Hildebrand, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1204 days.

(21) Appl. No.: 12/409,249

(22) Filed: Mar. 23, 2009

(51) Int. Cl.
G06Q 40/00 (2012.01)
G06Q 30/04 (2012.01)
G06Q 40/02 (2012.01)
G06Q 20/16 (2012.01)
G06Q 20/10 (2012.01)

(52) U.S. Cl.
CPC ............. G06Q 30/04 (2013.01); G06Q 20/10 (2013.01); G06Q 20/16 (2013.01); G06Q 40/02 (2013.01)

(58) Field of Classification Search
CPC ........ G06Q 40/02; G06Q 30/04; G06Q 20/16; G06Q 20/10
USPC ..................................................... 705/35–45
See application file for complete search history.

(56) References Cited

U.S. PATENT DOCUMENTS

| | | | |
|---|---|---|---|
| 7,617,156 B1* | 11/2009 | Wolfson | G06Q 20/10 705/42 |
| 7,899,750 B1* | 3/2011 | Klieman | G06Q 20/102 705/35 |
| 8,260,694 B1* | 9/2012 | Lauer | G06Q 20/14 379/111 |
| 2002/0120846 A1* | 8/2002 | Stewart | G06Q 20/04 713/168 |
| 2004/0049439 A1* | 3/2004 | Johnston | G06Q 20/102 705/34 |
| 2004/0186807 A1* | 9/2004 | Nathans | G06Q 30/06 705/38 |

(Continued)

FOREIGN PATENT DOCUMENTS

| | | | | |
|---|---|---|---|---|
| CA | 2519498 A1 * | 3/2006 | | G06Q 10/00 |
| WO | 200484047 A2 | 9/2004 | | |
| WO | WO-2006060412 A2 * | 6/2006 | | G06Q 20/102 |
| WO | 2008054425 A1 | 5/2008 | | |

OTHER PUBLICATIONS

Anonymous: "Pennsylvania Treasurer McCord to Pennsylvanians: You Have a Better Choice for Short-Term Loans" U.S. Newswire; Washington; Mar. 12, 2009 (Year: 2009).*

(Continued)

*Primary Examiner* — Edward J Baird
(74) *Attorney, Agent, or Firm* — Fish & Richardson P.C.

(57) ABSTRACT

Customers of a financial institution may apply for a line of credit for use with, e.g., a web-based bill pay service. The credit line may be determined using an average value of the customer's previously direct-deposited paychecks and an analysis of the customer's spending behavior using the web-based bill pay service. In some implementations, the financial institution may aggregate data points associated with the customer to make a determination of an amount, an interest rate, and a term of the line of credit. The line of credit may be used to pay bills from a financial services institution and unrelated third-party billers with which the customer has a payment history, as well as provide for cash for use by the customer.

23 Claims, 4 Drawing Sheets

(56) References Cited

U.S. PATENT DOCUMENTS

| | | | |
|---|---|---|---|
| 2004/0249753 A1* | 12/2004 | Blinn | G06Q 20/10 |
| | | | 705/41 |
| 2005/0187872 A1* | 8/2005 | Schmidt | G06Q 20/102 |
| | | | 705/40 |
| 2005/0273430 A1* | 12/2005 | Pliha | 705/42 |
| 2007/0013527 A1* | 1/2007 | Sloan | 340/573.4 |
| 2008/0040259 A1* | 2/2008 | Snow | G06Q 40/02 |
| | | | 705/38 |
| 2008/0103959 A1 | 5/2008 | Carroll et al. | |
| 2008/0215472 A1 | 9/2008 | Brown et al. | |
| 2008/0270304 A1 | 10/2008 | Brown et al. | |
| 2009/0164363 A1* | 6/2009 | Ahlers et al. | 705/38 |
| 2009/0164370 A1* | 6/2009 | Sorbe | G06Q 20/10 |
| | | | 705/40 |
| 2010/0241487 A1* | 9/2010 | Wolfson et al. | 705/10 |
| 2010/0241557 A1* | 9/2010 | Galit | G06Q 40/02 |
| | | | 705/38 |

OTHER PUBLICATIONS

Lott, Sue et al.: "Fringe Lending and "Alternative" Banking: The Consumer Experience", Public Interest Advocacy Centre, Nov. 2002, pp. 1-127.

Buckland, Jerry et al. "Serving or Exploiting People Facing a Short-term Credit Crunch? A Study of Consumer Aspects of Payday lending in Manitoba", Report for the Nov. 2007 Public Utilities Board Hearing to Cap Payday Loan Fees, Published Sep. 15, 2007, pp. 1-108.

\* cited by examiner

SYSTEMS AND METHODS FOR LOAN ORIGINATION AND SERVICING BASED ON A RECURRING DEPOSIT OF FUNDS

BACKGROUND

Individuals having less than optimal credit in need of a short-term loan often turn to high-interest payday loan services. Payday loans are typically a small, short-term loan that is intended to cover a borrower's expenses until his or her next payday. Finance charges on payday loans are typically in the range of 15 to 30 percent of the amount for the borrower's pay period (e.g., two weeks). This translates to an annual percentage rate (APR) between 390 percent and 780 percent. The process by which a payday loan is originated is fairly straightforward. The borrower writes a post-dated check to the lender for the full amount of the loan plus fees and interest. On the maturity date, the borrower is expected to return to repay the loan in-person. If the borrower does not repay the loan, the lender may process the check traditionally or through electronic withdrawal from the borrower's checking account.

In the United States, regulation of lending institutions is handled primarily by individual states. While payday lending is legal in a majority of states, laws that prohibit payday lending are usually in the form of usury limits, i.e., interest rate caps calculated strictly by APR. However, payday lenders have succeeded in avoiding usury laws in by forming relationships with nationally chartered banks based in states with no usury ceiling. Further, many borrowers find they repeatedly borrowing from payday lenders to make ends meet. As such, they fall victim to the high fees and interest rates and find it difficult to stay on a path of financial stability.

SUMMARY

Customers of a financial institution may apply for a line of credit for use with, e.g., a web-based bill pay service. The credit line may be determined using an average value of the customer's previously direct-deposited paychecks and an analysis of the customer's spending behavior using the web-based bill pay service. In some implementations, the financial institution may aggregate data points associated with the customer to make a determination of an amount, an interest rate, and a term of the line of credit. The line of credit may be used to pay bills from a financial services institution and unrelated third-party billers with which the customer has a payment history, as well as provide for cash for use by the customer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Figure 1:
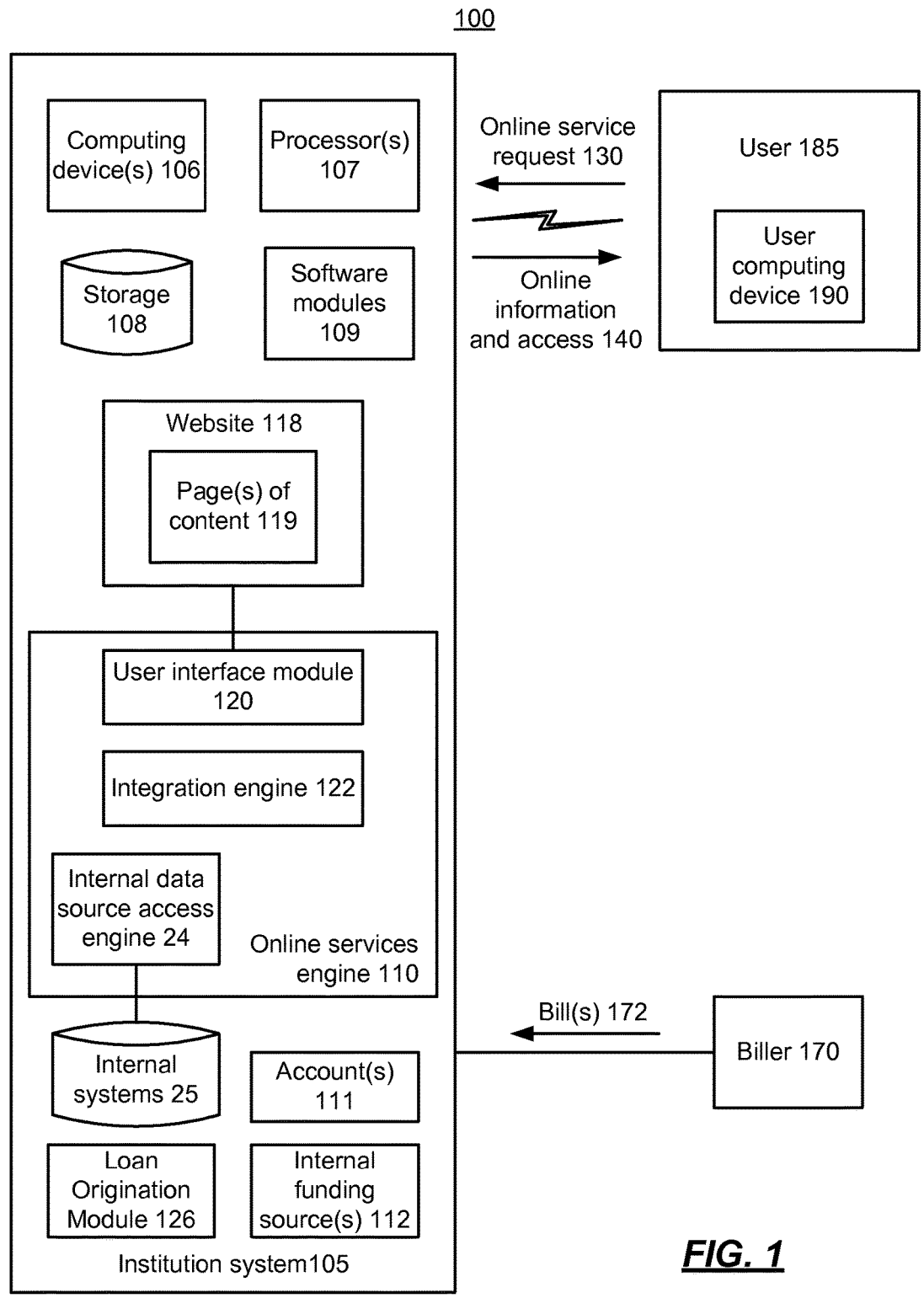
FIG. 1 is a block diagram of an implementation of a system that may be used to provide a short-term loan to a user.

FIG. 1 is a block diagram of an implementation of a system 100 that may be used to provide a short-term loan to a user. As a non-limiting overview, a user 185 may access an institutional system 105 using a user computing device 190. The user 185 may hold one or more account(s) 111 with a financial services institution associated with the institutional system 105. In accordance with implementations described below, the user 185 (customer) may apply for a short-term loan offered by the financial services institution by accessing the institutional system 105 at a website 118. The user 185 may complete a loan application, and the financial services institution may offer a short-term loan based on a history of direct deposited paychecks into the account(s) 111 associated with the user 185. The funds associated with a short-term loan may be used to pay e.g., bills 172 or other payments that are have been historically paid by the user 185. The short-term loan may have a duration of weeks or months, and may be repaid from the paycheck funds deposited into the account(s) 111.

In FIG. 1, the institution system 105 may be associated with or otherwise maintained by an institution such as the financial services institution, and may include an online services engine 110. The online services engine 110 may receive an online service request 130 from the user 185 via the user computing device 190, and provide online information and access 140 to the user 185, provide account information to the user 185 via the user computing device 190. An example user computing device 190 is described with respect to FIG. 4.

The online services engine 110 may include a user interface module 120, an integration engine 122, an internal data source access engine 124, and an external data source access engine 126. The user interface module 120 may generate and format one or more pages of content 119 as a graphical presentation that may be provided to the user computing device 190 as an output from the online services engine 110. The page(s) of content 119 may be provided to the user computing device 190 via a website 118 associated with the institution system 105.

The integration engine 122 provides the online services engine 110 the ability to retrieve information from and provide access to internal system 125. The user 185 can attend to all of his/her bills 172, whether those bills are received from the institution (or a company associated with the institution) or are received from a biller 170, such as an external provider or an outside biller. The integration 122 may also provide access to account information associated with account(s) 111, which may include checking accounts, savings accounts, brokerage accounts, and/or liability accounts (e.g., lines of credit, mortgages, auto loans, etc.).

The internal data source access engine 124 may be configured to access a plurality of internal systems 125. Each of the internal systems 125 may be a computer system that maintains account information for an account offered by the institution system 105. The internal systems 125 may each additionally provide financial services to the user 185. This may include one or more of the following, without limitation: depositing of funds, withdrawal of funds, monetary satisfaction of purchases, credit cards services and loan servicing. Any system that has the ability to electronically receive or send funds is considered to be within the scope of the present discussion.

The user 185 may have one or more account(s) 111 with the institution. When the user 185 accesses the institution system 105, they may be presented with information pertaining to their account(s) 111, via one or more pages of content 119 on the website 118. In an implementation, information may include account balances, outstanding loan balances, pending bills, a status of payments and bills, scheduled payments, and available funding sources.

The user 185 may interface with the institution system 105 via the website 118 that may display one or more pages of content 119 to the user 185 on the user computing device 190. A online service request 130 may be received at the institution system 105 through any suitable means, such as interaction with a web browser that is in communication with a bill-pay server or other computing device within the institution system 105. The actual mechanism of connection is outside the scope of the present discussion.

The request may be processed by the online services engine 110, which then provides the user 185 online information and access 140. In an implementation, information may include, without limitation, amount of funds available for payment, amount due for one or more pending bills 172, remaining balance on one or more credit card devices, etc. In an implementation, the online services engine 110 may interface with account(s) 111 that are maintained by the institution system 105. For instance, the user 185 may have a checking account, a credit card and an auto loan with the institution.

The user computing device 190 may provide user access to a system that is coupled to the online services engine 110 and is configured to receive a plurality of user requests, at least one of which is a online service request 130. A system may be configured to format and transmit a graphical user interface to user 185, and through the graphical user interface provide the user 185 the ability to interact with and manipulate one or more financial accounts or services provided by the institution system 105.

A user access system may be implemented as a web server, in an implementation. The user access system, through the use of any suitable interactive web technology, provides an interactive experience to the user 185 through which access to and maintenance of their financial obligations can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the online services engine 110 may include a loan originating module 126. The loan origination module 126 may be accessed by the internal data source access engine 124 and the integration engine 122 to present a user interface to the user 185 through the user interface module 120 and website 118. The user interface may be accessed by the user 185 seeking a short-term loan from the financial services institution. The short-term loan may be requested by the user 185 to cover expenses for a period of weeks or months, where the expenses may be defined by the bills 172 presented to the institution system 105. The user 185 may apply for short-term loan based on a known, recurring deposit made to the account(s) 111. For example, the recurring direct deposit may be a paycheck that is directly deposited into the account(s) 111 on a biweekly, monthly, or other basis.

The loan origination module 126 may receive a requested loan amount from the user 185, and examine aspects of the users' relationship with the financial services institution. For example, the following criteria may be examined: the user's tenure with the financial institution, the frequency of requests for short-term loans, a percentage that the loan amount represents with regard to the direct deposit amount, a number of account delinquencies, a number of overdrafts in the account(s) 111, etc.

In some implementations, because the user 185 has a pre-existing relationship with the financial services institution, the underwriting of the loan may be simplified. For example, the risk to the financial services institution may be mitigated by limiting the amount of the short-term loan to, e.g., 50% of the recurring direct deposit amount. Other percentages may apply based on the user's relationship with the financial services institution.

The loan origination module 126 may also determine repayment terms. For example, the repayment terms may specify how and when payments are due. The terms may specify the duration of the loan period. In addition, the repayment terms may specify that no other loans may be originated for the user 185 while a current loan is in a repayment period.

In accordance some implementations, the loan may be applied for either online or by contacting a customer service representative over the telephone. During a communication session, the user 185 may apply for loan using an application process, receive a decision as to whether the loan will be granted, and have his/her account(s) 111 credited by an amount associated with the short-term loan. The funds would be made available for use to pay bills 172 presented to the institutional system 105 for payment. As an anti-fraud measure, the institutional system 105 may require that only legitimate billers (e.g., those with an electronic relationship with the institutional system 105) may be paid using funds disbursed from the short-term loan. In some implementations, a portion of the short-term loan may be dispersed as cash to the user 185. Any combination of restrictions by the financial services institution on the loan terms and conditions and are considered to be within the scope of the present disclosure.

The institution system 105 may include one or more computing devices 106. A user computing device 190 may allow a user 185 to interact with the computing device(s) 106. The computing device(s) 106 may have one or more processors 107, storage 108 (e.g., storage devices, memory, etc.), and software modules 109. The computing device(s)

106, including its processor(s) 107, storage 108, and software modules 109, may be used in the performance of the techniques and operations described herein. Information associated with the account(s) 111 may be stored in storage 109 or other storage, for example.

Examples of software modules 109 may include modules for receiving a bill from a biller and associating it with an account, identifying and authenticating a user, generating web page content for display, receiving payment instructions from a user, receiving information from a user regarding loan products, loan servicing, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 4.

Figure 2:
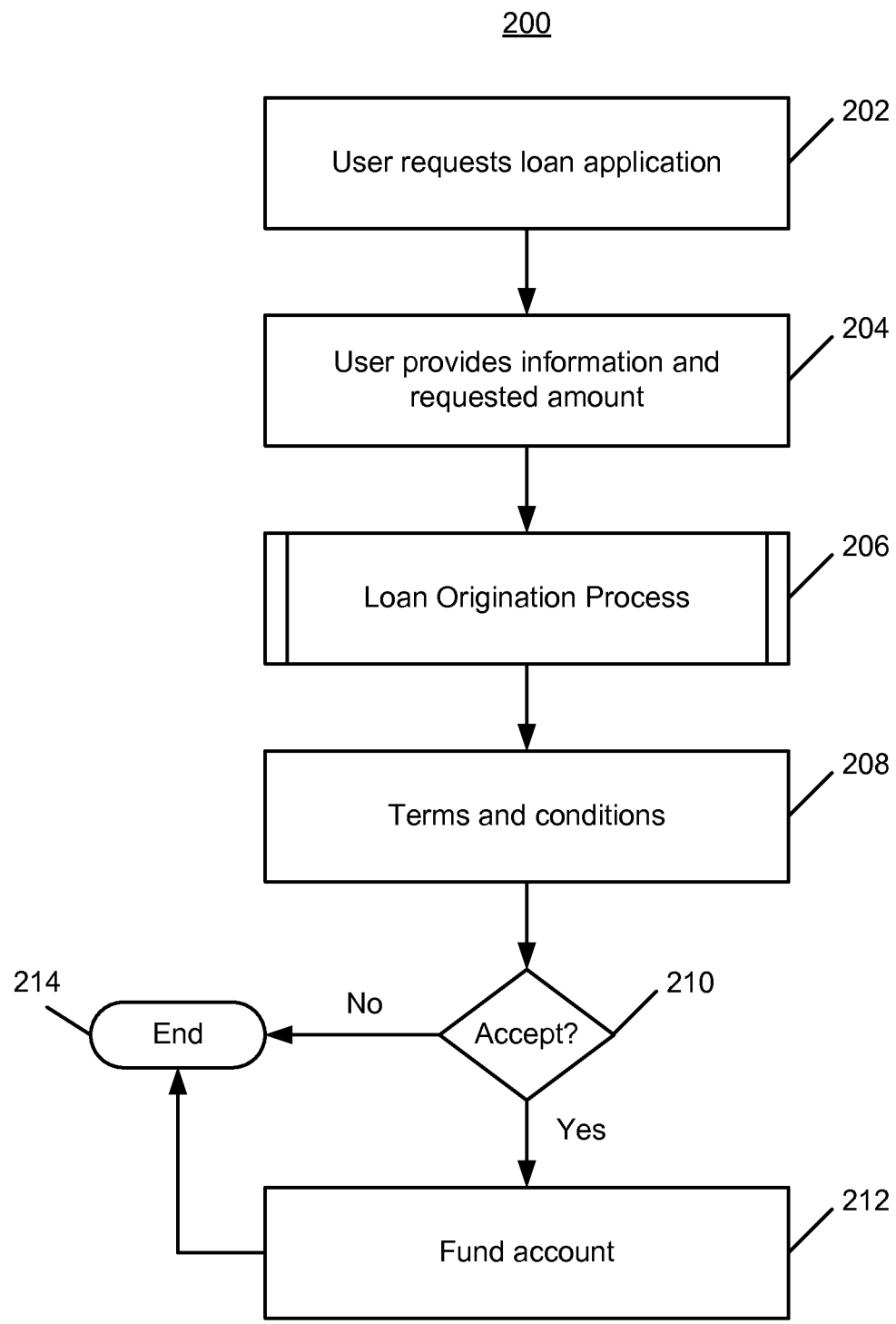
FIG. 2 is an operational flow of an implementation of a method of applying for short-term loan

FIG. 2 is an operational flow 200 of an implementation of a method of applying for short-term loan. At 202, the user requests a loan application. For example, the user 185 may access a website 118 using the user computing device 190. By entering the appropriate URL or by clicking the appropriate page content link, the user interface module 120 may access the internal system 125 to activate the loan origination module 126. The loan origination module 126 may populate information into the webpage content 119 for communication by the website 118 to the user computing device 190. In some implementations, the customer may contact a customer service representative of the financial services institution.

Figure 3:
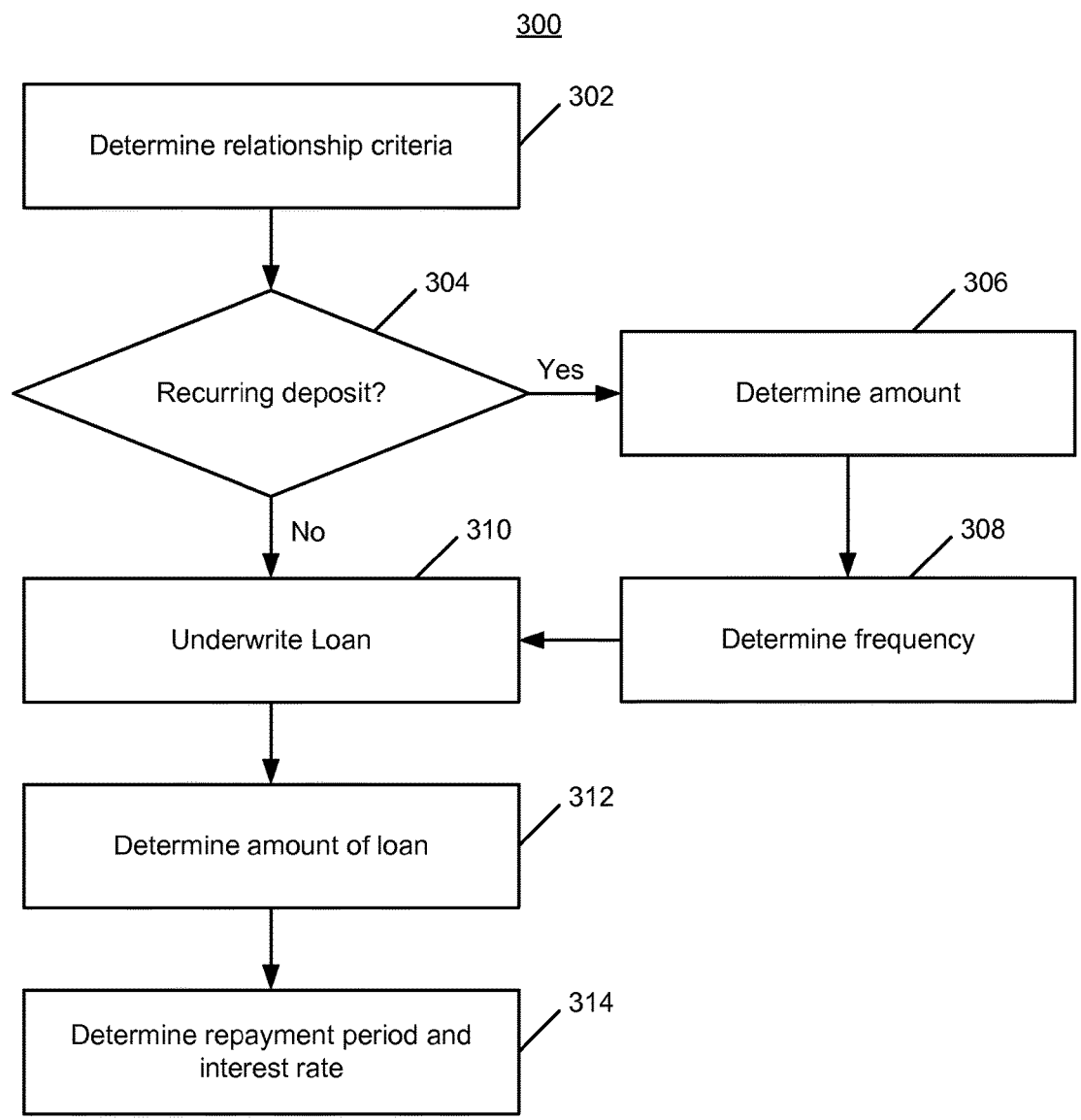
FIG. 3 illustrates an operational flow of an implementation of a method for a loan origination process.

At 204, the user provides information and a requested amount for the short-term loan. Information provided by the user 185 may include personal information about the user 185, the amount of the request for the loan, or other information as required by the loan origination module 126. At 206, a loan origination process is performed. The loan origination process is described in further detail in FIG. 3, which illustrates an operational flow 300 of an implementation of a method for a loan origination process.

At 302, relationship criteria are determined. For example, the criteria may be information known to the financial services institution about the user 185. Such information may include tenure with the financial services institution, a frequency of the directly deposited paychecks and amount(s), a number of overdrafts associated with account(s) 111 of the user 185, account delinquencies associated with the user 105, whether the user 185 has been turned down for any other products of the financial services institution, etc.

At 304, it is determined if the user has a recurring deposit, such as a paycheck. Because of the nature of short-term loans, a recurring deposit may be one factor that is weighed as part of the underwriting process to issue the short-term loan to the user 185. If the user has a recurring deposit at 304, then at 306 an amount of the recurring deposit is determined. Next, at 308, a frequency of the recurring deposit is determined. The frequency of the recurring direct deposit may be determined to eliminate "abnormal" deposits that may be associated with bonus amounts, etc.

At 310, loan underwriting is performed. This process may be performed whether or not the user has a recurring deposit at 304, however, the criteria assessed as part of the underwriting may be altered in view of the lack of a recurring deposit. The underwriting at 310 may include an analysis of whether the user 185 has applied for short-term loans in the past, a frequency of applications for short-term loans, overall credit history/worthiness, etc.

At 312, an amount of the loan is determined based on the underwriting at 310. For example, based on the frequency and amount of the return deposit determined at 306 and 308, the loan may be written for a percentage of the recurring deposit. If the user 185 does not have a recurring deposit, then the loan may be written for an amount in order to reduce the exposure of the financial services institution.

At 314, a repayment period and interest rate are determined. The repayment period may be limited to weeks or months based on, e.g., the frequency of the recurring direct deposit. For example, if the user 185 as a biweekly direct deposit, then the repayment period may be limited to, e.g., two pay periods. Similarly, if the user 185 has a monthly direct deposit, the repayment period may be limited to only one pay period. Other repayment periods are within the scope of the present disclosure.

After the loan origination process completes, the process returns to 208 where the terms and conditions of short-term loan are presented to the user. Terms and conditions may be presented as webpage content 119 provided to the user computing device 190, communicated orally by a customer services representative, communicated by facsimile, etc. At 210, it is determined if the user accepted the terms conditions of the short-term loan. For example, the user may accept the terms and conditions by clicking a link or a button on the webpage content 119, an oral acceptance (e.g., "I accept."), a signed returned facsimile, etc. An online acceptance may be communicated as an online service request 130 to the institution system 105.

At 212, if the user has accepted, then an account associated with the user is funded with the amount of the short-term loan, otherwise, the process ends at 214. The short-term loan funds may be deposited to one of the account(s) 111. As noted above, in some implementations, the funds credited to the account(s) 111 may be made available only to pay bills 172 presented to the institutional system 105. In other implementations, the funds may be available for any purpose. In some implementations, an interest-rate associated with the short-term loan may be variable in that a lower interest-rate would apply if the funds are used to satisfy bills 172, whereas a higher interest rate would apply if the user withdrawals the funds as cash. In some implementations, the acceptance of the short-term loan may affect the user's other products of the financial services institution. For example, the financial services institution may put a freeze on credit lines etc. to prevent the user 185 from attending to increase a credit line associated with a credit card or other loan product with the financial services institution. At 214, the process ends.

Thus, as described in implementations above, the financial services institution may provide users (i.e., customers of the financial institution) a self-service mechanism by which the customers may be able to apply for, and obtain a short-term loan. Terms and conditions of the loan may be determined based on characteristics of the customer (e.g., tenure, recurring direct deposits, etc.). The repayment period may also be set based on the frequency of direct deposits or other criteria. In addition, the financial services institution may place limitations on the use of the funds associated with the short-term loan in order to encourage fiscal responsibility and to prevent fraud.

Figure 4:
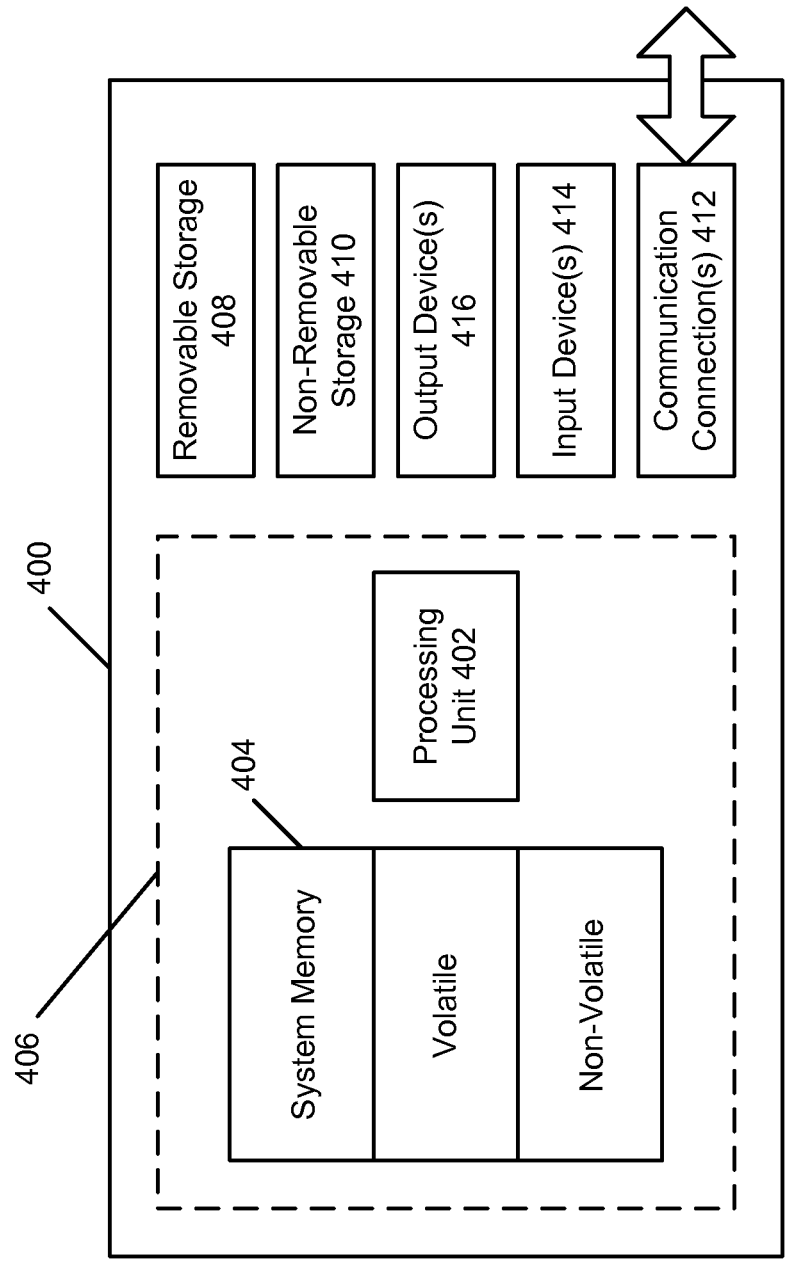
FIG. 4 is a block diagram of an example computing environment in which example embodiments and aspects may be implemented.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. System memory 404, removable storage 408, and non-removable storage 410 are all examples of computer storage media. Computer storage media includes, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions, which, when executed by a number of processors, cause a number of devices to perform a method for originating a short-term loan using a plurality of historical direct deposits to an account, said method comprising:
   providing, by a computer system, a user with a self-service interface that presents a display on a user device and enables the user to request a short-term loan while the user device is connected to the computer system;
   receiving a request at a website provided by a financial services provider for the short-term loan provided by the financial services provider to the user;
   ascertaining an amount of a plurality of historical direct deposits;
   ascertaining a frequency of the plurality of historical direct deposits;
   eliminating a deposit from the amount based on determining that the deposit is inconsistent with the frequency;
   determining a short-term loan amount as a percentage of the amount of the plurality of historical direct deposits; and
   determining a repayment schedule in accordance with the short-term loan amount and the frequency of the plurality of historical direct deposits, wherein the frequency of the plurality of historical direct deposits limits the repayment period of the short-term loan;
   restricting payment from funds from the short-term loan to only billers who have an electronic relationship with the financial services provider.

2. The non-transitory computer-readable medium of claim 1, wherein the method further includes deducting payments to repay the short-term loan from a future direct deposit.

3. The non-transitory computer-readable medium of claim 1, wherein the user holds an account with the financial services provider, and wherein the plurality of historical direct deposits is deposited to the account.

4. The non-transitory computer-readable medium of claim 1, wherein the method further includes:
   determining a tenure with the financial services provider; and
   determining if any corporate account delinquencies exist for the user.

5. The non-transitory computer-readable medium of claim 1, wherein the method further includes offering the short-term loan with terms and conditions set in accordance with a use of the short-term loan amount.

6. The non-transitory computer-readable medium of claim 1 further comprising:
   setting at least one condition on what the short-term loan may be used for.

7. A system configured to originate a short-term loan through a bill payment application provided by a financial services provider, the system comprising:
   processor resources; and
   memory resources coupled to the processor resources and configured to direct the processor resources to:
   providing a user with a self-service interface that presents a display on a user device and enables the user to request a short-term loan while the user device is connected to the computer system;
   receive instructions, at a website provided by the financial services provider, from the user device, at the bill payment application to initiate a loan application;
   receive information regarding an applicant for the short-term loan;
   determine the applicant has a plurality of historical direct deposits in an account at the financial services provider;
   eliminating a deposit based on determining that the deposit is inconsistent with a frequency of the plurality of historical direct deposits;
   deposit funds into the account at the financial services provider;
   determine a repayment schedule in accordance with a short-term loan amount and the frequency of the plurality of historical direct deposits, wherein the frequency of the plurality of historical direct deposits limits the repayment period of the short-term loan; and
   restricting payment from funds from the short-term loan to only billers who have an electronic relationship with the financial services provider.

8. The system of claim 7, further comprising: at least one computer subsystem that allocates a first portion of the funds for payment of bills; and
   at least one computer subsystem that allocates a second portion of the funds for cash withdrawals by the applicant.

9. The system of claim 8, wherein a first interest rate applies to the first portion, and a second interest rate applies to the second portion.

10. The system of claim 9, wherein the first interest rate is lower than the second interest rate.

11. The system of claim 7, further comprising at least one computer subsystem that allocates the funds to bills that have been previously presented to the bill payment application before the loan application is initiated.

12. The system of claim 7, further comprising at least one computer subsystem that deducts payments from a future deposit.

13. A system configured to provide a self-service, short-term loan application and origination process, the system comprising:
   processor resources; and
   memory resources coupled to the processor resources and configured to direct the processor resources to:
   provide a user with a self-service interface that presents a display a user device and enables the user to request a short-term loan while the user device is connected to the system;
   receive, at a website provided by a financial services provider, loan application information at the financial services provider from the user device;
   determine the user has a plurality of historical direct deposits to an account held at the financial services provider;
   determine an amount of a short-term loan using the plurality of historical direct deposits comprising eliminating a deposit from the amount based on determining that the deposit is inconsistent with a frequency of the plurality of historical direct deposits;
   determine a repayment schedule using the frequency of the plurality of historical direct deposits amount, wherein the frequency of the plurality of historical direct deposits limits the repayment period of the short-term loan;
   restrict payment from funds from the short-term loan to only billers who have an electronic relationship with the financial services provider;
   automatically deducting repayments from an amount of each future direct deposit; and
   credit the account with the amount of the short-term loan.

14. The system of claim 13, wherein the loan application is received and credited in a same session using the user interface.

15. The system of claim 13, further comprising:
- at least one computer subsystem that allocates a first portion of the amount of the short-term loan for payment of bills; and
- at least one computer subsystem that allocates a second portion of the amount of the short-term loan for cash withdrawals by the user.

16. The system of claim 15, wherein a first interest rate applies to the first portion, and a second interest rate applies to the second portion.

17. The system of claim 13, further comprising at least one computer subsystem that limits the user to a predetermined number of short-term loans within a predetermined period of time.

18. A system configured to provide a short-term loan to a customer having an account with a financial services provider, the system comprising:
- processor resources; and
- memory resources coupled to the processor resources and configured to direct the processor resources to:
  - provide a customer with a self-service interface that presents a display on a user device and enables the customer to request a short-term loan while the user device is connected to the system;
  - receive, at a website provided by the financial services provider, a request for the short-term loan from the user device;
  - ascertain customer income in accordance with a plurality of historical direct deposits;
  - determine exposure of the financial services provider with regard to financial products held by the customer;
  - write the short-term loan for an amount based on the plurality of historical direct deposits to the account comprising eliminating a deposit from the amount based on determining that the deposit is inconsistent with a frequency of the plurality of historical direct deposits;
  - freeze limits associated with the financial products held by the customer at a current amount;
  - determine a repayment schedule in accordance with the frequency of the plurality of historical direct deposits, wherein the frequency of the plurality of historical direct deposits limits the repayment period of the short-term loan; and
  - restrict payment from funds from the short-term loan to only billers who have an electronic relationship with the financial services provider.

19. The system of claim 18, further comprising at least one computer subsystem that limits the use of the amount for payment of bills presented to a bill payment application provided by the financial services provider.

20. The system of claim 18, wherein a first portion of the amount is allocated for payment of bills presented to a bill payment application provided by the financial services provider; and further comprising at least one computer subsystem that allocates a second portion of the funds for cash withdrawals by the customer.

21. The system of claim 20, wherein a first interest rate applies to the first portion, and a second interest rate applies to the second portion.

22. The system of claim 18, further comprising at least one computer subsystem that deducts payments from future deposits.

23. The system of claim 18, further comprising at least one computer subsystem that prevents writing subsequent short-term loans during the repayment period of the short-term loan.

* * * * *